United States Patent [19]

Richardson et al.

[11] Patent Number: 5,290,759
[45] Date of Patent: Mar. 1, 1994

[54] PROCESS FOR MAKING HIGH TEMPERATURE SUPERCONDUCTING POWDERS

[75] Inventors: J. T. Richardson; Dan Luss; D. Morgan; M. Maric, all of Houston, Tex.

[73] Assignee: University of Houston-University Park, Houston, Tex.

[21] Appl. No.: 864,168

[22] Filed: Apr. 3, 1992

Related U.S. Application Data

[63] Continuation of Ser. No. 588,284, Sep. 26, 1990, abandoned.

[51] Int. Cl.$^5$ .............. C01F 17/00; C01F 11/04; C01G 3/02; H01L 39/12
[52] U.S. Cl. .............. 505/1; 505/737; 505/738; 505/736; 252/518; 252/521; 423/263; 423/593
[58] Field of Search .............. 505/1, 737, 738, 736; 252/518, 521; 423/593, 263

[56] References Cited

U.S. PATENT DOCUMENTS

| | | | |
|---|---|---|---|
| 4,804,649 | 2/1989 | Sherif | 505/1 |
| 4,839,339 | 6/1989 | Bunker et al. | 505/1 |
| 4,886,777 | 12/1989 | Kimura et al. | 505/1 |
| 5,001,107 | 3/1991 | Bunker et al. | 505/738 |
| 5,023,067 | 6/1991 | Spencer et al. | 505/738 |

OTHER PUBLICATIONS

Voigt et al., "A Hydroxycarbonate Route to Superconductor Precursor Powders," *Mat. Res. Soc. Symp. Proc.* vol. 99, 1988, pp. 635–638.

Clearfield et al., "Preparation and Characterization of Nearly Domain Free 123-Oxide . . . ," *Mat. Res. Bull.* vol. 25, pp. 923–931, Jul. 1990.

A Hydroxycarbonate Route to Superconductor Precursor Powders; J. A. Voight, B. C. Bunker, D. H. Doughty, D. L. Lamppa, and K. M. Kimball; Sandia National Laboratories, Albuquerque, N.Y., 1988.

Preparation and Characterization of Nearly Domain Free 123-Oxide Showing a Superconducting Transition Width of 1.1K; A. Clearfield; *Mat. Res. Bull.*, vol. 25, pp. 923–931, 1990.

On the Coprecipitation Method for the Preparation of High $T_c$ M-X-Cu-O (M=Ba, Sr, X=La, Y) System; *Japanese Journal of Applied Physics*, vol. 26, No. 5, May, 1987, pp. L734–L735; Keiji Kaneko.

High-$T_c$ Superconductors: Selective Preparation and Characterization of Tetragonal and Orthorhombic (93 K Superconductor) Phases of $YBa_2Cu_3O_{7-x}$; Kini et al.,; *Inorg. Chem.*, 1987, vol. 26, 1834–1836.

A Model for the Preparation of $YBa_2Cu_3O_{7-\delta}$ Orthorhombic Phase by Controlled Precipitation of Oxalates; *Mat. Res. Bull.*, vol. 23, pp. 1273–1283; 1988; Frederi Caiilaud, Jean-Francois Baumard and Agnes Smith.

Coprecipitation Method for Preparation of Superconducting $YBa_2Cu_3O_x$ Compounds; *Mat. Res. Bull.*, vol. 23, pp. 1693–1698, 198; P. Pramanik.

Preparation of 1-2-3 Superconductors from Hydroxide-Carbonate Coprecipitation; *J. Am. Ceram. Soc.*, vol. 73, No. 12, pp. 3557–3561, Dec. 1990; Douglas Morgan, Milena Maric, Dan Luss and James Richardson.

High $T_c$ Superconductivity of La-Ba-Cu Oxies, S. Uchida et al., *Jpn. J. Appl. Phys.*, 26 (1987), p. L1.

Superconductivity and Electronic Structure of $Sr_xLa_{2-x}CuO_{4-y}$ Prepared Under Reducing Condition, H. Ihara et al., *Jpn. J. Appl. Phys.* 28 (1987), p. L463.

Precipitation of Superconductor Precursor Powders, B. C. Bunker, J. A. Voight, D. H. Doughty, "High Temperature Superconducting Materials: Preparation, Properties and Processing", (W. E. Hatfield and J. H. Miller, Ed.) M. Dekker, Inc., New York, 1988, pp. 121–129.

Homogeneous Coprecipitation as a Means toward High $T_c$ and Sharp-Transition $YBa_2Cu_3O_{7-x}$ Superconducting Oxides; *Inorg. Chem.*, 1989, vol. 28, 154–156; R. S. Liu.

*Primary Examiner*—Paul Lieberman
*Assistant Examiner*—Bradley A. Swope
*Attorney, Agent, or Firm*—Pravel, Hewitt, Kimball & Krieger

[57] ABSTRACT

Superconducting precursors, which can be made into metal oxide superconductors such as $YBa_2Cu_3O_{6+x}$, and a process for their manufacture by the coprecipitation of 1-2-3 nitrates using inexpensive precipitating agents such as alkali hydroxides, carbonates and bicarbonates. The process involves preparing a stoichiometric mixture of Y, Ba and Cu nitrates, which is then combined with a solution containing an excess of $NaOH/K_2CO_3$, $KOH/K_2CO_3$, $NaOH/Na_2CO_3$, or $KOH/Na_2CO_3$, which causes the precipitation of the precursor. The suspension containing the precipitate is filtered and then washed with the pH maintained at values from 7 to 9 by the presence of $CO_2$, introduced, for example, by sparging, which greatly reduces cation loss and improves the washing by peptizing the precipitation. After filtering, washing and drying, the dried precursor is fired by heating in air and then slowly cooled to form the superconductor.

29 Claims, No Drawings

PROCESS FOR MAKING HIGH TEMPERATURE SUPERCONDUCTING POWDERS

The invention of this application was made and conceived at least in part with United States Government support and the United States Government has certain rights in the invention.

This is a continuation of co-pending application Ser. No. 588,284 filed on Sep. 26, 1990, now abandoned.

BACKGROUND OF THE INVENTION

1. Field of the Invention

This invention relates to novel high temperature superconducting (HTS) metal oxide powders and a process for making same, and more particularly, to high quality HTS powders, typically $YBa_2Cu_3O_{6+x}$, where x is between 0.5 and 1.0, and a process for making same which uses inexpensive reagents, involves simple unit processes, and can be readily scaled for commercial operations.

2. Background of the Invention

High temperature superconducting materials can be fabricated by a variety of techniques, of which solid state, solvent removal, sol-gel, and coprecipitation are currently the most widely used.

In the solid state technique one starts with oxygen-containing compounds of the desired components. Typically, one would start with oxides, nitrates, or carbonates of Sc, Y or one or more of the rare metals having atomic numbers of from 57 to 71, one or more of the alkaline earth metals, and copper. These solid state compounds are mixed in the desired atomic ratios and ground to a fine powder. The compounds are then reacted by calcining for an extended period at elevated temperatures. The pulverization and calcination steps may be repeated a number of times. The material is then oxygen-annealed and cooled slowly to room temperature.

Solvent removal routes include spray-drying, spray roasting, and freeze drying.

In the sol-gel process an aqueous solution containing the proper ratios of, for example, Y, Ba and Cu nitrates is emulsified in an organic phase and the resulting drops of the discontinuous phase are gelled by the addition of high molecular weight primary amine which serves to extract the nitric acid.

In the coprecipitation process high temperature superconductor precursors are produced by simultaneous precipitation from a solution containing the metal cations. Once the precipitate has been dried, the material can undergo calcination, as in the solid state process.

The coprecipitation technique is considerably less complicated than the sol-gel and the solvent removal processes and can thus be more readily scaled up to commercial scale operations. Coprecipitation methods are attractive for large-scale powder production because of the desirable stoichiometry, homogeneity, and particle size control.

The main advantages of coprecipitation over the solid state technique are that coprecipitation (1) allows for the simultaneous and controlled precipitation of all the components at a fixed ratio, (2) produces a pure, homogeneous, and fine-grained powder, and (3) leads to a reproducible commercial process upon scale-up.

In the coprecipitation process the dissolved cations must dissolve simultaneously in a fixed and constant ratio out of a solution saturated with a precipitating agent. Further, the pH of the solution must be controlled to give product of optimal quality.

A number of coprecipitation techniques have been disclosed in the literature. Most use expensive reagents such as oxalates, alkoxides or tetraammonium hydroxide. For example, U.S. Pat. No. 4,804,649 uses a potassium oxalate precipitating reagent. Similarly, oxalic acid is used in S. Uchida, H. Takagi, K. Kitazawa and S. Tanaka, *Jpn. J. Appl. Phys.* 26 (1987) L1, H. Ihara, M. Hirabayashi, N. Terada, Y. Kimura, K. Senzaki and M. Tokumoto, *Jpn. J. Appl. Phys.* 26 (1987) L463, National Institute for Research in Inorganic Materials Research Report of the National Institute for Research in Inorganic Materials No. 49 (1986) p. 4, and K. Kaneko, H. Ihara, M. Hirabayashi, N. Terada and K. Senzaki, *Jpn. J. Appl. Phys.* 26 (1987) L734.

Oxalates are also used in F. Caillaud, J. Baumard and A. Smith, *Mat. Res. Bull.*, 23 (1988) 1273, and in P. Pramanik, S. Biswas, C. Singh, D. Bhattacharya, T. K. Dey, D. Sen, S. K. Ghatak and K. L. Chopra, *Mat. Res. Bull.*, 23 (1988) 1693. Urea is used in R. S. Liu, C. T. Chang and P. T. Wu, *Inorg. Chem.*, 28 (1989) 154.

B. C. Bunker, J. A. Voight, and H. D. Doughty, "High Temperature Superconducting Materials: Preparation, Properties and Processing", (W. E. Hatfield and J. H. Miller, Ed.), M. Dekker, Inc., New York, 1988, describe the achievement of simultaneous precipitation in a flow system using tetramethylammonium hydroxide and $CO_2$. Extensive washing was avoided and good stoichiometry achieved. However, the reagent used is expensive.

Attempts have been made to use inexpensive precipitation agents such as alkalis. These attempts have been largely unsuccessful primarily because of lack of proper pH control and solubility differences among the cations lead to the redissolving of the components during washing and aging.

In addition, previous attempts resulted in the retention of unacceptably high amounts of the alkalis, the presence of which degrades the effectiveness of the product superconductor and may even prevent it from achieving the superconducting state.

Two examples of such attempts can be found in I. Legrand, M. Maric, D. Luss, and J. T. Richardson, "Preparation of the 1-2-3 Superconductor by Hydroxide Coprecipitation Route", submitted for publication, and A. M. Kini, U. Geiser, H. C. I. Kao, K. D. Carlson, H. H. Wang, M. R. Monaghan, and J. M. Williams, *Inorg. Chem.*, 26 1834–36 (1987).

Kini et al. developed a procedure in which a 1-2-3 nitrate solution is neutralized to a pH of from 7 to 8 with KOH. Potassium carbonate solution is then added and the precipitate centrifuged and washed with water adjusted to a pH of 9.7 to avoid loss of barium. This technique introduces inhomogeneities in the precipitate. Addition of KOH to the nitrate solution may also result in formation of basic nitrates of copper, which later dissolve to change give nonstoichiometry. In addition, yttrium hydroxide precipitates early. Unless care is taken to stir the solutions well, addition of the carbonate to the nitrate also produces uneven precipitation in the high pH regions of the mixture.

Thus, many of the presently known coprecipitation techniques share, to some degree, the disadvantage of using an expensive precipitation agent. Other techniques lead to the retention of excessive amounts of foreign material in the precipitate which leads to a degradation of the superconductor properties. Many of the known techniques are wasteful of the metal components. This would lead to less than optimal commercial operations when the process is scaled up.

It would be desirable to have high temperature superconducting materials, in particular $YBa_2Cu_3O_{6+x}$, which would have excellent properties and which could be produced by simple operations, using inexpensive reagents and which could be easily scaled up to commercial continuous operations.

It would also be desirable to have a process for making high quality high temperature superconductors using coprecipitation wherein the conditions are controlled to give products of the stoichiometric ratios with little or no loss of cation.

It would be further desirable to be able to wash the precipitated precursor gel in such a manner as to prevent the loss of cations and at the same time to greatly reduce or eliminate contaminants from the product.

Specifically, there is a clear need for high quality superconducting materials which can be made by a coprecipitation process which is simple, which uses inexpensive reagents, and which can easily be scaled up to a full-scale commercial process which is easy to implement and operate and capable of continuously producing the desired superconducting product.

SUMMARY OF THE INVENTION

The present invention successfully addresses the shortcomings of the presently known processes, by providing a process for the manufacturing of high temperature superconductors by coprecipitation using inexpensive reagents such as alkali hydroxides, carbonates and bicarbonates, and a novel method of controlling the pH after precipitation using carbon dioxide.

The present invention is of a process for forming superconductor processes, particularly those which can be used to make the 1-2-3 metal oxide superconductor of the general formula $LM_2Cu_3O_y$, where L is Sc, Y or one or more of the rare metals having atomic numbers of from 57 to 71, and M is one or more of the alkaline earth metals and of the superconductor processes formed by that process. The preferred superconductor is $YBa_2Cu_3O_{6+x}$. The process is practiced by preparing a stoichiometric mixture of the salts of the metal moieties. This solution is combined with a second solution containing an excess of hydroxy base as a carbonate compound. This causes the precipitation of a blue-gray gel-like precipitate.

The suspension containing the precipitate is separated from the combined solution. The precipitate is then washed with the pH maintained at values from 7 to 9 by the addition, as through sparging, of a chemical which tends to not preferentially dissolve the barium, such as $CO_2$. This prevents cation loss and improves the washing. The mixture is filtered again, washed as before, and dried yielding the superconductor precursor.

The dried powder may then be fired to form a superconducting powder or it may first be shaped and then fired. In the first alternative, the precursor powder is first fired by heating in air and then slowly cooled yielding the superconductor. The superconductor may then be shaped into the desired configurations most suitable for the specific application envisioned.

Alternatively, the precursor powder may first be shaped into the appropriate configuration and then fired to form the superconductor of the desired shape.

DESCRIPTION OF THE PREFERRED EMBODIMENTS

The recent discovery of the 1-2-3 class of "high temperature superconducting" (HTS) materials has stimulated research and development work in both potential applications of HTS materials and in improved methods of fabricating HTS materials on a commercial scale.

Commercial manufacturing of high temperature ceramic superconductors requires processes which are continuous and economical, produce high quality and uniform material, and are easily scaled to high production rates. One potentially suitable process is the coprecipitation of superconductor precursors from mixed salt solutions, followed by appropriate drying, calcination, and annealing.

Previously published routes have used expensive reagents, such as alkoxides or tetraammonium hydroxide, or complicated process steps, such as those involved in the sol-gel treatment.

A method which meets the criteria of simplicity and economy would involve using readily available and inexpensive reagents such as alkali hydroxides, carbonates, or bicarbonates. Previous attempts to use such reagents have been unsuccessful because of solubility differences among the various cations, which tended to redissolve the components during aging and washing.

In addition, previous processes resulted in the retention of alkalis, such as sodium and potassium, which are harmful and which degrade the superconducting properties of the product or even prevent the achievement of the superconducting state. The present invention is of a process which avoids the above difficulties, and of a superconductor precursor fabricated by the process of the present invention.

The present invention can be applied in the fabrication of a large number of superconductors, including the various perovskite metal oxide superconductors of the general formula $LM_2Cu_3O_y$, where L is Sc, Y or one or more of the rare metals having atomic numbers of from 57 to 71, and M is one or more of the alkaline earth metals. A representative class includes those superconductors of the formula $YBa_2Cu_3O_y$, as well as materials where Y is replaced by Nd, Sm, Eu, Gd, Dy, Ho, Yb, Lu, $Y_{0.5}Sc_{0.5}$, $Y_{0.5}La_{0.5}$, and $Y_{0.5}Lu_{0.5}$, and where Ba is substituted by Sr-Ca, Ba-Sr, and Ba-Ca.

For purposes of this disclosure, and without in any way limiting the scope of the present invention, general procedures for making a superconductor precursor of a $LM_2Cu_3O_{6+x}$ composition will be described in terms of the superconductor $YBa_2Cu_3O_{6+x}$.

The first step involves the formation of two aqueous solutions. The first solution ("A") is an aqueous solution of a mixture of 1-2-3 salts. The salts can be any salts as long they are soluble, including, but not limited to, sulphates, oxalates, chlorides, citrates and acetates. Nitrates are preferred. Any convenient nitrates may be used. Typical of such nitrates are $Y(NO_3)_36H_2O$, $Ba(NO_3)_2$, and $Cu(NO_3)_23H_2O$. The solution is prepared by dissolving the proper amounts of three nitrates, one each of Y, Ba, and Cu, in the proper metal moiety stoichiometric ratio of 1:2:3 desired in the final product, in a convenient amount of deionized water. The dissolution can be carried out at a wide range of temperatures with room temperature being preferred as most convenient. The nitrates solution typically has a pH of about 3.

In preparing solution A, sufficient 1-2-3 nitrates are added to the deionized water so that the total solution cation molarity at 25° C. is between 0.01 and 1, preferably between 0.03 and 0.6, and most preferably between 0.1 and 0.6.

The second solution ("B") is an aqueous solution containing a hydroxy base and a carbonate or bicarbonate compound, with the molar ratio in the range of from about 6:1 to 1:5, preferably in the range of from about 4:1 to 1:4, and most preferably in the range of from about 2:1 to 4:1. One combination of hydroxy base and carbonate or bicarbonate compound is sodium hydroxide (NaOH) and potassium carbonate ($K_2CO_3$).

Potassium hydroxide (KOH) may be substituted for NaOH. Similarly, sodium carbonate ($Na_2CO_3$) may be substituted for $K_2CO_3$. Potassium is the preferred cation for both the hydroxide and the carbonate because it is easier to remove by washing. Other alkali elements such as lithium or cesium or $NH_4$ may be substituted for potassium and sodium. The amount of $K_2CO_3$ or $Na_2CO_3$ is 2 to 4 times that required to precipitate the barium ions, preferably about 3 times the required amount, and the pH of the alkali solution is greater than 14.

Solution A containing the 1-2-3 nitrates is added rapidly to a well-stirred solution B containing an excess of NaOH/$K_2CO_3$, or related species. Addition of the nitrate solution to alkali solution is better than adding the alkali solution to the nitrate solution. The latter gives products which, while of the proper stoichiometry, failed to achieve the superconducting state. Without in any way limiting the scope of the present invention, it is believed that this result was obtained because of the preferential precipitation of $Cu(OH)_2$ at lower pH. Additionally, it is believed that $CO_3^=$ may be consumed by reaction with $H^+$ ions, thus liberating $CO_2$. It was concluded that precipitation at higher pH was more controllable and gave better results.

Without in any way limiting the scope of the present invention, it is believed that the purpose of the NaOH/$K_2CO_3$ mixture is to cause the precipitation of $Y(OH)_3$, $Cu(OH)_2$ and $BaCO_3$, which are mutually insoluble in the pH range of from 12 to 13. Too much NaOH leads to the formation of $Ba(OH)_2$ which is soluble and which leads to loss of barium. Use of NaOH alone results in losses of as much as 60% of the barium.

A precipitate begins to form upon contacting of the solutions. The combined solution is stirred vigorously during precipitation, which usually takes about three minutes and is complete when the pH decreases to about 12 to 13. The gel-like precipitate is blue. X-ray diffraction analysis shows the precipitate to be a mixture of $Cu(OH)_2$, $BaCO_3$ and $Y_2O_3$ or $Y(OH)_3$, with a composition of $Y(OH)_3 2BaCO_3 3Cu(OH)_3$. Precipitation is complete within three to five minutes. Typical yields are in excess of 98%.

It is important to avoid long contact times or elevated temperatures, which tend to cause the precipitate to change color from blue to grayish-brown, most probably due to oxidation of Cu to the various copper oxides. Aging of the solution beyond the time needed to effect the precipitation has three effects. First, larger particles are formed which settle faster. Second, the color changes from blue to gray-brown, indicating the oxidation of the copper ion. Finally, the amount of alkali retained by the precipitate is increased.

The precipitate is immediately separated from the suspension by any convenient means, such as filtration or decantation. Filtration can be achieved using vacuum filtration, as with a Buchner funnel, using a fine grade filter paper, and washing with distilled water, using 6 to 10 liters of deionized water for each mole of total cation precipitated. The water used may or may not contain carbon dioxide.

The filter cake remaining at the conclusion of the filtration may be promptly resuspended in 15 to 30 liters of deionized water for each mole of total cations precipitated. The water used may or may not contain carbon dioxide. The precipitate is then washed by decantation for ten to thirty minutes, during which the pH is maintained in the range of about 7 to 9 by the presence of carbon dioxide. The $CO_2$ may be introduced as dissolved in the solution or may be sparged through the suspension. The presence of the $CO_2$ lowers the pH of the suspension to a range wherein cation loss is minimized. In addition, the $CO_2$ sparging causes the precipitate particles at the lower pH to peptize or become smaller, thus making the washing more effective. Any chemical may be used which is capable of forming a solution which does not preferentially dissolve the barium, with $CO_2$ being most preferred.

The mixture is again filtered, and washed in the same manner as before. It is then dried in air at 110° C. Any convenient drying temperature can be used. Typical values are in the range of 50 to 200° C. The color changes from blue to gray during the drying.

The dried precursor powder can next be fired by heating in air with about 10% to about 100% excess oxygen, preferably with about 10% to about 30% excess oxygen at a rate of from about 1°/min. to about 100°/min., preferably from about 20°/min. to about 20°/min., most preferably approximately 25°/min. The final temperature can be in the range of from about 850 to about 950° C., preferably from about 900 to about 930° C., most preferably approximately 920° C. That temperature is held for a period of from about 0.1 to about 20 hours, preferably from about 5 to about 10 hours, and the material is then slowly cooled at a rate which can range from about 1°/min. to about 100°/min., preferably from 2°/min. to about 10°/min., and most preferably approximately 5°/min., in oxygen to room temperature. No annealing is necessary for unpressed powders.

Alternatively, the precursor powder could first be formed into the desired shape and then fired to form the superconductor. In this case annealing may be necessary.

Precipitation can be carried out in a wide range of temperatures. Precipitation can be conducted at temperatures in the range of from 0 to 70° C., preferably from 20 to 70° C., and most preferably at or near room temperature. It would ordinarily have been expected that higher yields would be achieved at higher temperatures, since the solubilities of the 1-2-3 salts are greater at higher temperatures. However, experimental observations indicated that faster, more homogeneous and complete precipitation occurred when the solutions were not heated. It was thus concluded that best results are achieved at the lowest practical temperatures.

The properties of the superconducting product obtained depend on a variety of process parameters. Among these is the ratio of the hydroxy acid to the carbonate compound, the rate of addition of the nitrate solution, aging time prior to filtration, and the washing conditions. The effects of some of these parameters can be better understood with reference to the Examples which follow.

The properties of the final product are dependent on the final product stoichiometry, the amount of alkali impurity left in the product, and the particle size of the precursor powder.

According to the process of the present invention, the pH of the solution during the precipitation and washing stages is controlled by the amount of alkali added during precipitation and by the $CO_2$ sparging. In addition, it is desirable to keep the washing to a minimum. When this is done, the resulting powder has virtually the same stoichiometry as the original nitrate solution. Typically, analysis of the wash water shows essentially no Cu or Y and no more than 35 ppm of Ba.

Alkali contamination of the superconductor precursor can be significant. Typically, the unwashed gel contains 6 to 7 wt % total alkalis. Upon washing, this is reduced to 0.3 to 0.4 wt % under the optimum conditions. Such conditions call for operations to take place at 25° C. and for use of as much water during the wash as possible without exceeding 30 liters per mole of total cation precipitated.

A small amount of alkali contaminants in the superconductor precursor is not detrimental to the properties of the final superconductor product since upon heating, as during the firing stage to oxidize the precursor, the remaining alkalis tend to vaporize, yielding a final product with no detectable K or Na.

The mean particle size of the unfired precursor is about 0.8 to 0.9 microns, with about 90% of the particles below 2 microns. The surface area of the precursor is about 60 $m^2/g$ and the density is about 3.9 $g/cm^3$. The particle size of the fired material is in the range of about 1 to 2 microns.

The process of the present invention yields superconductors having excellent properties. The final fired product of this process contains a single orthorhombic phase of $YBa_2Cu_3O_{6+x}$. No green phase is detectable with X-ray diffraction. The product density is in the range of about 6.10 to 6.34 $g/cm^3$. The $T_c$ value is 98° K. and 92° K., measured from resistance and magnetic measurements, respectively. The Meissner effect gives 95%+ superconductivity, and the value of critical current density, $J_c$, for a sample prepared by partial melting is 18,000 $amp/cm^2$. The value of x in $YBa_2Cu_3O_{6+x}$ is typically in the range of about 0.6 to 0.7.

The HTS material made with the precursor of the present invention has superconductivity properties which are superior to those of other known precipitation techniques.

While the present invention is described in accordance with the specific examples below, it is understood that these are only for illustrative purposes.

EXAMPLES

In the examples which follow compositions were determined with a Perkin Elmer ICP 5500 system with a precision of 1% and an alkali detection limit of 20 ppm.

The crystalline phases present were determined with a Siemens D 5000 Diffractometer. Resolution between tetragonal and orthorhombic phases, determined from calculated intensities of characteristic lines, was within 2%.

Thermal decomposition studies were carried out with a Perkin Elmer DTA System and a TGS-2 Thermal Gravimetric Analyzer (TGA) interfaced with a Dycor Quadrupole Gas Analyzer MA-200.

Particle size distributions were measured with a Horiba Particle Size Distribution Analyzer CAPA 700. Surface areas were measured with a Quantachrome Quantasorb. Densities were measured with a Quantachrome Multi Pycnometer. Morphology of the powder was studied with a Cambridge Instruments Stereoscan 250MK3 scanning electron microscope.

Superconductivity in the calcined powders was measured using two separate magnetic methods. The first was a push-pull fluxmeter used for rapid screening of samples. The second was a Princeton Applied Research Vibrating Sample Magnetometer Model 155, used to measure magnetic susceptibilities down to 4° K.

The $T_c$ and $J_c$ of the pelletized powders were determined using the four point probe method. Oxygen content was measured using the modified iodometric method described in E. H. Appleman, L. R. Morss, A. M. Kini, U. Geiser, A. Umegawa, G. W. Grabtree, and K. D. Carlson, *Inorg. Chem.*, 26 3237-39 (1987).

EXAMPLE 1

(1) A first solution ("A") was prepared by dissolving 7.60 g of $Y(NO_3)_36H_2O$, 10.37 g of $Ba(NO_3)_2$, and 14.05 g of $Cu(NO_3)_23H_2O$ in 4 liters of deionized water. It should be noted that the precise degree of hydration of the available copper nitrate was unknown which required the use of an amount of the copper nitrate which does not correspond exactly with the amount which would have been required if the degree of hydration was exactly as shown in the above chemical formula. The molarity of Solution A was approximately 0.03 M and the pH was approximately 3.

(2) A second solution ("B") was prepared by dissolving 22.08 g of NaOH and 22.81 g of $K_2CO_3$ in 250 $cm^3$ of deionized water. The potassium carbonate used in this and the other Examples was actually in hydrated form with an equivalent formula of $K_2CO_32.5H_2O$. For convenience, the potassium carbonate will be referred to by the forumula $K_2CO_3$. The total molarity of Solution B was 1.97 M, the ratio of NaOH to $K_2CO_3$ was 4:1, and the pH was greater than 14.

(3) 1150 $cm^3$ of Solution A was added rapidly to Solution B with vigorous stirring at room temperature. A light blue precipitate formed as the pH dropped. The reaction was complete when the pH reached about 12.5, taking 3-5 minutes.

(4) The suspension was filtered immediately using a Buchner funnel with vacuum.

(5) The filter cake was washed with 200-400 $cm^3$ of deionized water.

(6) The filter cake was transferred to a tank containing 250 $cm^3$ of deionized water. Carbon dioxide was bubbled through the water in order to maintain the pH in the range of 7 to 9. Washing continued until the precipitate completely peptized or dispersed, which took about 30 minutes.

(7) Step (4)—filtering with the Buchner funnel—was repeated.

(8) Step (5)—washing with 200-400 $cm^3$ of deionized water—was repeated.

(9) The precipitate was dried at 110° C. for 2 to 4 hours.

(10) Steps (1) through (9) Were repeated three times except that the wash volumes used in each succeeding Step (6) were 500, 750 and 4000 $cm^3$, in that order.

An elemental analysis was performed on solution A and on the precipitate at various stages of the process using. The results of the elemental analyses are shown in Table A.

TABLE A

| Nitrate Concentration = 0.03M NaOH/$K_2CO_3$ = 4:1 Elemental Analysis | | | | | |
|---|---|---|---|---|---|
| | Y | Ba | Cu | Na | K |
| Solution A | 0.98 | 1.98 | 3.00 | 0 | 0 |
| After 250 cm$^3$ wash | 1.00 | 2.00 | 3.00 | 3.79 | 1.05 |
| After 500 cm$^3$ wash | 1.00 | 2.00 | 3.00 | 1.52 | 0.63 |
| After 750 cm$^3$ wash | 1.00 | 2.00 | 3.00 | 0.37 | 0.31 |
| After 4000 cm$^3$ wash | 0.96 | 1.98 | 3.00 | 0.25 | 0.22 |

Increasing the wash water during decantation is an effective way to improve alkali removal. However, use of too much wash water increases cation loss. As can be seen from Table I, for 0.035 moles of 1-2-3 precipitate, increasing the volume of the wash water from 250 to 750 cm$^3$ resulted in a substantial decrease in alkali content. A further increase to 4000 cm$^3$ gave better results, but only marginally so. Since lower wash volumes are more operationally practical, washes of between 500 cm$^3$ and 750 cm$^3$ were routinely used.

The unfired, dried powder following the wash with 250 cm$^3$ had a density of 3.9 g/cm$^3$, a surface area of 59 m$^2$/g, and a mean particle size of 0.8 to 0.9 microns, with 90% of the particles being smaller than 2 micron.

An X-ray defraction pattern was taken of the uncalcined precursor powder. The diffraction of the dried precipitate consisted of well defined peaks of $Cu(OH)_2$ and $BaCO_3$, and there were no peaks of any known copper hydroxycarbonates. Peaks corresponding to yttrium oxide, hydroxide and carbonate were also absent. Without in any way limiting the scope of the present invention, these data suggest that the precursor was a mixture of $Cu(OH)_2$ and $BaCO_3$ or $Y(OH)_3$. Separate or mixed hydroxycarbonates of these compounds were not detected.

The dried powder following the wash with 4000 cm$^3$ was heated in air with 30% excess oxygen at a rate of 25° C./min to a temperature of 920° C. The temperature was maintained for 5 hours. The material was then cooled at 2° C./min in oxygen to 25° C. It is believed that a possible composition for the precursor is $Y(OH)_3 \cdot 2BaCO_3 \cdot 3Cu(OH)_3$.

The TGA and DTA data show a gradual endothermic weight loss, amounting to about 12.2 wt %, between 100° C. and 600° C. Without in any way limiting the scope of the present invention, it is believed that this results from the decomposition of $Y(OH)_3$ and $Cu(OH)_3$. Also occurring between 750° C. and 950° C., is the decomposition of $BaCO_3$. This decomposition gives a further weight loss amounting to 11.1 wt %.

The resulting material had a single phase X-ray structure of $YBa_2Cu_3O_{6+x}$, with no detectable green phase present. The precise stoichiometry was determined to be $Y_{1.01}Ba_{2.00}Cu_{3.00}O_{6.66}$.

X-ray diffraction of the calcined material indicated that the orthogonal 1-2-3 phase was present with an estimated purity of 98+%. No other phases were detected. This was confirmed by the magnetic susceptibility curve which showed a Meissner effect of 98+% of theoretical, under zero field cooling conditions. These data combine to indicate that the particles produced were homogeneous.

The value of $T_c$ for the onset of superconductivity was 95° K. from the magnetic data, with a mid-transition value of about 82° K. Four point resistance measurements on pressed pellets gave 98° K. for onset and 87° K. for zero resistance. Values of $J_c$ for these pellets were in the range of 100-200 amp/cm$^2$ but gave values greater than 18,000 amp/cm$^2$ following partial melting. Electron micrographs of the calcined powder showed large elongated single crystals, partially covered with smaller particles. The precursor density was 6.34 g/cm$^3$. The alkali content was less than $2 \times 10^{-3}$ wt %.

EXAMPLE 2

(1) A first solution ("A") was prepared by dissolving 7.60 g of $Y(NO_3)_3 \cdot 6H_2O$, 10.37 g of $Ba(NO_3)_2$, and 14.05 g of $Cu(NO_3)_2 \cdot 3H_2O$ in 4 liters of deionized water. The molarity of Solution A was approximately 0.03 M and the pH was approximately 3.

(2) A second solution ("B") was prepared by dissolving 1.81 g of KOH and 1.33 g of $K_2CO_3$ in 21.4 cm$^3$ of deionized water. The pH was greater than 14 and the ratio of KOH to $K_2CO_3$ was 4:1.

(3) 70 cm$^3$ of Solution A was added rapidly to Solution B with vigorous stirring at room temperature. A light blue precipitate formed as the pH dropped. The reaction was complete when the pH reached about 12.5, taking 3-5 minutes.

(4) The suspension was filtered immediately using a Buchner funnel with vacuum.

(5) The filter cake was washed with 200-400 cm$^3$ of deionized water.

(6) The filter cake was transferred to a tank containing 200 cm$^3$ of deionized water. Carbon dioxide was bubbled through the water in order to maintain the pH in the range of 7 to 9. Washing continued until the precipitate completely peptized or dispersed, which took about 30 minutes.

(7) Step (4)—filtering with the Buchner funnel—was repeated.

(8) Step (5)—washing with 200-400 cm$^3$ of deionized water—was repeated. (9) The precipitate was dried at 110° C. for 2 to 4 hours.

An elemental analysis was performed on solution A and on the precipitate after the wash with 200 cm$^3$ using the techniques described in Example 1. The results of the elemental analyses are shown in Table B.

TABLE B

| Nitrate Concentration = 0.03M KOH/$K_2CO_3$ = 4:1 Elemental Analysis | | | | | |
|---|---|---|---|---|---|
| | Y | Ba | Cu | Na | K |
| Solution A | 0.98 | 1.98 | 3.00 | 0 | 0 |
| After 200 cm$^3$ wash | 0.99 | 1.93 | 3.00 | — | 0.53 |

EXAMPLE 3

(1) A first solution ("A") was prepared by dissolving 7.60 g of $Y(NO_3)_3 \cdot 6H_2O$, 10.37 g of $Ba(NO_3)_2$, and 14.05 g of $Cu(NO_3)_2 \cdot 3H_2O$ in 4 liters of deionized water. The molarity of Solution A was approximately 0.03 M and the pH was approximately 3.

(2) A second solution ("B") was prepared by dissolving 1.29 g of NaOH and 0.853 g of $Na_2CO_3$ in 26.4 cm³ of deionized water. The pH was greater than 14 and the ratio of OH⁻ to CO₃²⁻ was 4:1.

(3) 70 cm³ of Solution A was added rapidly to Solution B with vigorous stirring at room temperature. A light blue precipitate formed as the pH dropped. The reaction was complete when the pH reached about 12.5, taking 3-5 minutes.

(4) The suspension was filtered immediately using a Buchner funnel with vacuum.

(5) The filter cake was washed with 200-400 cm³ of deionized water.

(6) The filter cake was transferred to a tank containing 300 cm³ of deionized water. Carbon dioxide was bubbled through the water in order to maintain the pH in the range of 7 to 9. Washing continued until the precipitate completely peptized or dispersed, which took about 30 minutes.

(7) Step (4)—filtering with the Buchner funnel—was repeated.

(8) Step (5)—washing with 200-400 cm³ of deionized water—was repeated.

(9) The precipitate was dried at 110° C. for 2 to 4 hours.

An elemental analysis was performed on solution A and on the precipitate after the wash with 300 cm³ using the techniques described in Example 1. The results of the elemental analyses are shown in Table C.

TABLE C

| Nitrate Concentration = 0.03M NaOH/Na₂CO₃ = 4:1 Elemental Analysis | | | | | |
|---|---|---|---|---|---|
| | Y | Ba | Cu | Na | K |
| Solution A | 0.98 | 1.98 | 3.00 | 0 | 0 |
| After 300 cm³ wash | 1.00 | 1.99 | 3.00 | 0.41 | — |

As Examples 1-3 demonstrate, the stoichiometry of the precursor is virtually the same regardless of the particular Na and K combination used in the alkali solution. Table D shows the comparable number taken from Examples 1, 2 and 3 for comparison. The operationally preferred alkali mixture is KOH/K₂CO₃, since potassium is easier to remove by washing and vaporization than is sodium.

TABLE D

| | Nitrate Concentration = 0.03M | | | | |
|---|---|---|---|---|---|
| Ex. | | Y | Ba | Cu | Na | K |
| 1 | NaOH/K₂CO₃ | 1.00 | 2.00 | 3.00 | 3.79 | 1.05 |
| 2 | KOH/K₂CO₃ | 0.99 | 1.93 | 3.00 | — | 0.53 |
| 3 | NaOH/Na₂CO₃ | 1.00 | 1.99 | 3.00 | 0.41 | — |

EXAMPLE 4

(1) A first solution ("A") was prepared by dissolving 76.0 g of Y(NO₃)₃6H₂O, 109.2 g of Ba(NO₃)₂, and 149.65 g Cu(NO₃)₂3H₂O in 6 liters of deionized water. The molarity of Solution A was approximately 0.21 M and the pH was approximately 3.

(2) A second solution ("B") was prepared by dissolving 4.49 g of KOH and 3.32 g of K₂CO₃ in 66 cm³ of deionized water. The pH was greater than 14 and the ratio of KOH to K₂CO₃ was 4:1.

(3) 41 cm³ of Solution A was added rapidly to Solution B with vigorous stirring at room temperature. A light blue precipitate formed as the pH dropped. The reaction was complete when the pH reached about 12.5, taking 3-5 minutes.

(4) The suspension was filtered immediately using a Buchner funnel with vacuum.

(5) The filter cake was washed with 200-400 cm³ of deionized water.

(6) The filter cake was transferred to a tank containing 500 cm³ of deionized water. Carbon dioxide was bubbled through the water in order to maintain the pH in the range of 7 to 9. Washing continued until the precipitate completely peptized or dispersed, which took about 30 minutes.

(7) Step (4)—filtering with the Buchner funnel—was repeated.

(8) Step (5)—washing with 200-400 cm³ of deionized water—was repeated.

(9) The precipitate was dried at 110° C. for 2 to 4 hours.

An elemental analysis was performed on solution A and on the precipitate after the wash with 500 cm³ using the techniques described in Example 1. The results of the elemental analyses are shown in Table E.

TABLE E

| Nitrate Concentration = 0.21M KOH/K₂CO₃ = 4:1 Elemental Analysis | | | | | |
|---|---|---|---|---|---|
| | Y | Ba | Cu | Na | K |
| Solution A | 0.98 | 1.98 | 3.00 | 0 | 0 |
| After 500 cm³ wash | 1.02 | 1.95 | 3.00 | — | 0.37 |

EXAMPLE 5

(1) A first solution ("A") was prepared by dissolving 76.0 g of Y(NO₃)₃6H₂O, 109.2 g of Ba(NO₃)₂, and 149.6 g Cu(NO₃)₂3H₂O in 6 liters of deionized water. The molarity of Solution A was approximately 0.21 M and the pH was approximately 3.

(2) A second solution ("B") was prepared by dissolving 3.20 g of NaOH and 3.32 g of K₂CO₃ in 66 cm³ of deionized water. The pH was greater than 14 and the ratio of NaOH to K₂CO₃ was 4:1.

(3) 41 cm³ of Solution A was added rapidly to Solution B with vigorous stirring at room temperature. A light blue precipitate formed as the pH dropped. The reaction was complete when the pH reached about 12.5, taking 3-5 minutes.

(4) The suspension was filtered immediately using a Buchner funnel with vacuum.

(5) The filter cake was washed with 200-400 cm³ of deionized water.

(6) The filter cake was transferred to a tank containing 500 cm³ of deionized water. Carbon dioxide was bubbled through the water in order to maintain the pH in the range of 7 to 9. Washing continued until the precipitate completely peptized or dispersed, which took about 30 minutes.

(7) Step (4)—filtering with the Buchner funnel—was repeated.

(8) Step (5)—washing with 200-400 cm³ of deionized water—was repeated.

(9) The precipitate wa dried at 110° C. for 2 to 4 hours.

An elemental analysis was performed on solution A and on the precipitate after the wash with 500 cm³ using the techniques described in Example 1. The results of the elemental analyses are shown in Table F.

TABLE F

Nitrate Concentration = 0.21M
NaOH/K$_2$CO$_3$ = 4:1
Elemental Analysis

|  | Y | Ba | Cu | Na | K |
|---|---|---|---|---|---|
| Solution A | 0.98 | 1.98 | 3.00 | 0 | 0 |
| After 500 cm$^3$ wash | 0.97 | 1.77 | 3.00 | 0.75 | 0.65 |

Again, as was the case with Examples 1-3, the stoichiometry of the precursor formed at the higher nitrate concentrations of Examples 4 and 5 is virtually the same regardless of the particular Na and K combination used in the alkali solution. This is demonstrated in Table G.

TABLE G

Nitrate Concentration = 0.21M

| Ex. |  | Y | Ba | Cu | Na | K |
|---|---|---|---|---|---|---|
| 4 | KOH/K$_2$CO$_3$ | 1.02 | 1.95 | 3.00 | — | 0.37 |
| 5 | NaOH/K$_2$CO$_3$ | 0.97 | 1.77 | 3.00 | 0.75 | 0.65 |

EXAMPLE 6

The effect of the OH$^-$ to CO$_3^=$ ratio was studied. The ratio was varied from 8:1 to 1:4. Barium losses were evident for the 8:1 ratio. Consistently good stoichiometry was found in the range 4:1 to 1:4. These results are displayed in Table H.

TABLE H

| OH$^-$/CO$_3$ = | Y | Ba | Cu | Na | K |
|---|---|---|---|---|---|
| 8:1 | 0.97 | 1.77 | 3.00 | 0.30 | 0.10 |
| 4:1 | 0.99 | 2.01 | 3.00 | 0.37 | 0.31 |
| 2:1 | 0.99 | 2.00 | 3.00 | — | — |
| 1:2 | 0.96 | 2.00 | 3.00 | — | — |
| 1:4 | 1.02 | 1.95 | 3.00 | 0.21 | 0.46 |

The relative fluxmeter magnetization results at 77° K. indicated that the quality of the resulting superconductor was the same for both powders. Alkali contamination was about the same over the entire range.

EXAMPLE 7

Increasing the wash temperature resulted in decrease alkali removal and gave some indications of increased cation loss, as shown in Table I.

TABLE I

| Wash Temp. (°C.) | Y | Ba | Cu | Na | K |
|---|---|---|---|---|---|
| 25 | 0.99 | 2.01 | 3.00 | 0.37 | 0.31 |
| 40 | 1.02 | 2.00 | 3.00 | 0.39 | 0.31 |
| 50 | 0.98 | 1.89 | 3.00 | 0.60 | 0.48 |
| 60 | 0.97 | 1.92 | 3.00 | 0.87 | 0.71 |

EXAMPLE 8

A sample prepared according to the procedure of Example 1 was divided into seven aliquot portions and each placed in a furnace at 930° C. in a flow of air plus 30% excess oxygen. Calcination was carried out in a ceramic tube approximately 2.5 cm in diameter inserted in a muffle furnace. Each portion was heated for different times and the resulting alkali concentrations are shown in Table 6. The ICP detection limit was $2 \times 10^{-3}$ wt %. Residual alkali contamination after washing and drying was reduced essentially to zero through vaporization of sodium and potassium during calcination. A rapid decrease was observed in the first hour of calcination, after which the alkali fell below the instrument detection limit. This is shown in TABLE J

TABLE J

Alkali concentrations after heating at 930° C.

| Time of heating (min) | Alkali wt % | |
|---|---|---|
|  | Na | K |
| 0 | 0.632 | 0.520 |
| 15 | 0.680 | 0.461 |
| 30 | 0.486 | 0.227 |
| 45 | 0.092 | 0.027 |
| 60 | 0.024 | 0.036 |
| 90 | 0 | 0 |
| 135 | 0 | 0 |
| 180 | 0 | 0 |

This concludes the description of preferred embodiments of applicant's invention. Those skilled in the art may find many variations and adaptations thereof, and all such variations and adaptations, falling within the true scope and spirit of applicant's invention, are intended to be covered thereby.

What is claimed is:

1. A process for making a precursor useful in the making a superconductor of the general formula LM$_2$Cu$_3$O$_y$, where L is Sc, Y or a rare earth metal selected from the group consisting of rare earth metals with an atomic number from 57 to 71, and M is an alkali metal, comprising:

(a) adding a first solution to a second solution to form a combined solution and to induce the formation of a precipitate, the first solution including soluble salts of the L, M and Cu moieties which are to be contained in the superconductor precursor and the second solution including a hydroxy base and a carbonate or bicarbonate compound;

(b) separating the precipitate from the combined solution;

(c) thereafter, adding carbon dioxide while washing the precipitate, the amount of carbon dioxide being sufficient to maintain a pH of about 7 to 9.

2. A process for making a precursor useful in the making a superconductor of the general formula LM$_2$Cu$_3$O$_y$, where L is Sc, Y or a rare earth metal selected from the group consisting of rare earth metals with an atomic number from 57 to 71, and M is an alkali metal, comprising:

(a) adding a first aqueous solution to a second aqueous solution to form a combined solution and to induce the formation of a precipitate, the first aqueous solution including soluble salts of the L, M and Cu moieties which are to be contained in the superconductor precursor and the second aqueous solution including a hydroxy base and a carbonate or bicarbonate compound;

(b) separating the precipitate from the combined solution;

(c) thereafter, adding carbon dioxide while washing the precipitate, the amount of carbon dioxide being sufficient to maintain a pH of about 7 to 9;

(d) separating the precipitate; and (e) drying the precipitate to yield the superconductor precursor.

3. A process as in claim 2 wherein the L and M moieties are Y and Ba, respectively.

4. A process as in claim 3 wherein the superconductor precursor contains Y, Ba, and Cu in the ratio of about 1:2:3.

5. A process as in claim 3 wherein the soluble salts are sulphates, oxalates, chlorides, citrates, acetates, or nitrates of the metal moieties.

6. A process as in claim 3 wherein the soluble salts are nitrates of the metal moieties.

7. A process as in claim 3 wherein the soluble salts of the metal moieties are $Y(NO_3)_3 3H_2O$, $Ba(NO_3)_2$, and $Cu(NO_3)_2 H_2O$.

8. A process as in claim 7 wherein the total molarity of the metal moieties is in the range of from about 0.01 to about 1.00 M.

9. A process as in claim 3 wherein the hydroxy base is sodium hydroxide, potassium hydroxide, lithium hydroxide, or cesium hydroxide.

10. A process as in claim 3 wherein the hydroxy base is potassium hydroxide.

11. A process as in claim 3 wherein the carbonate or bicarbonate compound is sodium carbonate, potassium carbonate, lithium carbonate, cesium carbonate, or ammonium carbonate.

12. A process as in claim 3 wherein the carbonate or bicarbonate compound is potassium carbonate.

13. A process as in claim 3 wherein the molar ratio of the hydroxy base to the carbonate or bicarbonate compound is in the range of from about 6:1 to about 1:5.

14. A process as in claim 3 wherein the amount of carbonate or bicarbonate compound is in an excess of from about 10% to about 30% over the amount required to precipitate the M moiety.

15. A process as in claim 3 wherein the combining of the first and second aqueous solution is accompanied by vigorous stirring.

16. A process as in claim 3 wherein the separation of the precipitate from the combined solution is accomplished by filtering.

17. A process as in claim 3 wherein the carbon dioxide is introduced by sparging.

18. A process as in claim 3 wherein the drying is accomplished with air at a temperature in the range of about 50 to about 200° C.

19. A process for making a superconductor of the general formula $LM_2Cu_3O_y$, where L is Sc, Y or a rare earth metal selected from the group consisting of rare earth metal with an atomic number from 57 to 71, and M is an alkali metal, comprising:
(a) adding a first aqueous solution to a second aqueous solution to form a combined solution and to induce the formation of a precipitate, the first aqueous solution including soluble salts of the L, M and Cu moieties which are to be contained in the superconductor precursor and the second aqueous solution including a hydroxy base and a carbonate or bicarbonate compound;
(b) separating the precipitate from the combined solution;
(c) thereafter, adding carbon dioxide while washing the precipitate, the amount of carbon dioxide being sufficient to maintain a pH of about 7 to 9;
(d) separating the precipitate;
(e) drying the precipitate; and
(f) firing the dried precipitate to form the superconductor.

20. A process as in claim 19 wherein the L and M moieties are Y and Ba, respectively.

21. A process as in claim 19 wherein the superconductor contains Y, Ba, and Cu in the ratio of about 1:2:3.

22. A process as in claim 19 wherein the soluble salts are nitrates of the metal moieties.

23. A process as in claim 19 wherein the hydroxy base is potassium hydroxide.

24. A process as in claim 19 wherein the carbonate or bicarbonate compound is potassium carbonate.

25. A process as in claim 19 wherein the carbon dioxide is introduced by sparging.

26. A process as in claim 19 wherein the firing is achieved while said dried precipitate is contacting a gas containing oxygen in the range of from about 10% to about 100%.

27. A process as in claim 19 wherein the firing is controlled so as to increase the temperature at a rate of from about 100° C./min to about 1° C./min to a final firing temperature of from about 850 to about 950° C.

28. A process as in claim 19 wherein the final firing temperature is maintained for a period of from about 0.1 to about 20 hours.

29. A process as in claim 19 wherein the superconductor is cooled from the final firing temperature to about room temperature at the rate of from about 100° C./min. to about 1° C./min.

* * * * *